US007022800B2

(12) United States Patent
Tachikawa et al.

(10) Patent No.: US 7,022,800 B2
(45) Date of Patent: Apr. 4, 2006

(54) ORGANOSILOXANE COMPOSITIONS

(75) Inventors: Mamoru Tachikawa, Kanagawa Prefecture (JP); Toshio Saruyama, Chiba Prefecture (JP); Kazutoshi Okabe, Chiba Prefecture (JP); Hiroshi Adachi, Chiba Prefecture (JP); Francois De Buyl, Brussels (BE); Luo Cheng Zhang, Kanagawa (JP)

(73) Assignee: Dow Corning S.A., (BE)

( * ) Notice: Subject to any disclaimer, the term of this patent is extended or adjusted under 35 U.S.C. 154(b) by 271 days.

(21) Appl. No.: 10/169,647

(22) PCT Filed: Jan. 4, 2001

(86) PCT No.: PCT/EP01/00070

§ 371 (c)(1),
(2), (4) Date: Oct. 3, 2002

(87) PCT Pub. No.: WO01/49789

PCT Pub. Date: Jul. 12, 2001

(65) Prior Publication Data

US 2004/0214965 A1 Oct. 28, 2004

(30) Foreign Application Priority Data

| Jan. 6, 2000 | (JP) | 2000-005783 |
| Feb. 24, 2000 | (JP) | 2000-048125 |
| Apr. 20, 2000 | (GB) | 00096842 |
| Apr. 20, 2000 | (JP) | 2000-126265 |
| Apr. 20, 2000 | (JP) | 2000-126266 |
| Apr. 20, 2000 | (JP) | 2000-126268 |

(51) Int. Cl.
*C08G 77/08* (2006.01)

(52) U.S. Cl. .......................... 528/17; 528/34; 502/161

(58) Field of Classification Search ............... 528/17, 528/34; 502/161
See application file for complete search history.

(56) References Cited

U.S. PATENT DOCUMENTS

| 3,334,067 | A | | 8/1967 | Weyenberg | |
| 3,708,467 | A | | 1/1973 | Smith et al. | |
| 4,007,050 | A | | 2/1977 | Laufer et al. | |
| 4,100,129 | A | * | 7/1978 | Beers | 524/425 |
| 4,111,890 | A | | 9/1978 | Getson et al. | |
| 4,438,039 | A | * | 3/1984 | Beers et al. | 556/40 |
| 4,683,251 | A | | 7/1987 | Mikami | |
| 4,962,076 | A | | 10/1990 | Chu et al. | |
| 5,264,603 | A | | 11/1993 | Altes et al. | |
| 5,767,302 | A | | 6/1998 | Ogi et al. | |
| 6,482,888 | B1 | * | 11/2002 | Ahn et al. | 524/588 |

FOREIGN PATENT DOCUMENTS

| EP | 0164470 | 12/1985 |
| EP | 0076630 | 1/1986 |
| EP | 0354267 | 2/1990 |
| EP | 354267 | 2/1990 |
| EP | 0361803 | 4/1990 |
| EP | 0164470 | 7/1994 |
| EP | 0747443 | 12/1996 |
| EP | 0802222 | 10/1997 |
| EP | 08082222 | 10/1997 |
| FR | 2747675 | 10/1997 |
| GB | 962061 | 6/1964 |
| JP | 62252456 | 11/1987 |
| JP | 04103668 | 4/1992 |
| JP | 0143141 | 11/1993 |
| JP | 05287261 | 11/1993 |
| JP | 05311077 | 11/1993 |
| JP | 08048710 | 2/1996 |
| JP | 08165389 | 6/1996 |
| JP | 0221624 | 6/1997 |
| WO | 0149789 | 7/2001 |

OTHER PUBLICATIONS

Fleeting, Inorg. Chem (1999), 38(7), 1432-1437.
Errington, Polyhedron (1998), 17 (5-6), 659-674, Ferret, Elf Atochem, S.A. France.
Bharara, Synth. Reaction Inorg. met. Org Chem. 1975 5(1) 59-67.

* cited by examiner

*Primary Examiner*—Margaret G. Moore
(74) *Attorney, Agent, or Firm*—Robert L. McKellar; McKellar IP Law, PLLC

(57) ABSTRACT

A moisture curable composition capable of cure to an elastomeric body, comprising a polymeric material having not less than two hydroxyl or hydrolyzable groups an alkoxysilane curative and a catalyst comprising:

a mixture and/or reaction product of a compound (i) $M[OR]_4$ and compound (ii) $M[OR']_x[Z]_z$, wherein M represents a metal having a valency of 4 selected from Group IVB of the Periodic Table, preferably titanium or zirconium. Each R and R' may be a primary, secondary or tertiary aliphatic hydrocarbon or the group $SiR^9_3$; and a compound iii) of the general formula $$A-C(=O)R^1-C(=O)-B$$

wherein $R^1$ is a methylene group or a substituted methylene radical, A is selected from $-(CX_2)_nC(R^2)_3$ wherein n is from 0 to 5, and an adamantyl group or a derivative thereof; B is selected from the group of $-(CX_2)_tC(R^2)_3$ wherein t is from 0 to 5; a monovalent alkyl group having from 1 to 6 carbon atoms and; $OR^3$, wherein $R^3$ is selected from the group of $-(CX_2)_tC(R^2)_3$ and a monovalent alkyl group having from 1 to 6 carbon atoms; wherein each X is the same or different and is selected from the group of a halogen radical and hydrogen, each $R^2$ is the same or different and is selected from the group of a halogen radical and an alkyl radical having one to eight carbon atoms, and when n is greater than 0 at least one of X or $R^2$ is a halogen radical

14 Claims, No Drawings

ORGANOSILOXANE COMPOSITIONS

FIELD OF THE INVENTION

This invention is concerned with moisture curable organosiloxane compositions which are curable to elastomeric solids and also relates to the use of such compositions as sealing materials.

BACKGROUND OF THE INVENTION

Organosiloxane compositions which cure to elastomeric solids are well known. Typically such compositions are obtained by mixing a polydiorganosiloxane having reactive terminal groups, generally silanol groups, with a silane cross-linking agent reactive with the polydiorganosiloxane, for example an acetoxysilane, an oximesilane, an aminosilane or an alkoxysilane. These materials are frequently curable upon exposure to atmospheric moisture at room temperature.

One important application of the above-described curable compositions is their use as sealants. In use as sealants, it is important that the composition is capable of curing in comparatively thick layers to provide an elastomeric body having a thickness greater than about 2 mm. It is frequently desirable that the composition cures quickly enough to provide a sound seal within several hours but not so quickly that the surface cannot be tooled to desired configuration shortly after application. Among specifically desirable attributes for such compositions are fast surface cure rate, good elasticity of the skin formed and lack of surface tackiness after curing for about 24 hours. Also, it has long been desired to have a clear, translucent or "water white" product which retains its translucency and lack of colour during use.

In order to achieve the desired speed of cure of alkoxysilane cured silicone compositions it has become a practice to employ certain organic titanium compounds as catalysts for the condensation reaction. Some of these titanium compounds are apt to react with methoxysilane to form a white precipitate and this gives a discolouration and restricts the ability of the composition to cure. The titanium compounds most generally preferred for this purpose are those derived from primary or secondary alcohols, for example, isopropyl alcohol and n-butyl alcohol. However, the titanium compounds employed in practice are often inadequate to promote a sufficiently rapid and/or deep cure and it is a practice to employ a chelating agent for example an acetyl acetonate as an accelerator and stabilizer for the titanium compound, which accelerators generally cause a yellow discoloration. Examples of such accelerators are described in the following prior art.

U.S. Pat. No. 3,334,067 describes a method of preparing a one package room temperature silicone rubber by mixing an hydroxylated siloxane polymer with a silane cross-linking agent and a beta-dicarbonyl titanium compound such as bis(acetylacetonyl)diisopropyl titanate. EP0164470 describes an organopolysiloxane fluid containing at least two alkoxysilyl organic radicals and titanium, zirconium, hafnium metal or vanadium oxide esters soluble in the liquid. EP0361803 describes a method for the in situ formation of titanium chelate catalysts in which a silicone sealant is prepared by adding an alkoxy or hydroxy end-blocked polydiorganosiloxane, an alkoxy functional cross-linker and a titanate catalyst. In this case the titanate catalyst is a tetraorgano titanate such as tetra isopropoxy titanate and tetra butoxy titanate to which ethylacetoacetate is added. U.S. Pat. No. 4,438,039 describes a titanium chelate catalyst which does not form nodules upon storage and comprises the reaction product of a two stage reaction system. The first reaction was between $Ti[OR]_4$ and the following two ketones

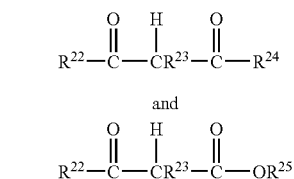

where $R^{22}$ is said to be halogen substituted or unsubstituted monovalent hydrocarbon radicals, $R^{23}$ is hydrogen, hydrocarbyl, halohydrocarbyl or acyl $R^{24}$ is a radical having not more than eight carbon atoms consisting of hydrocarbyl, halohydrocarbyl, cyanoalkyl or amino groups and $R^{25}$ is a hydrocarbon radical, amino, ether or a polyether. No examples of halogen substituted hydrocarbon radicals are provided. The resulting products are then reacted with a diol HO—$R^{26}$—OH where $R^{26}$ is an alkylene group having 2 to 20 carbon atoms to form the final catalyst. The examples and claims teach that $R^{23}$ is Hydrogen, $R^{22}$ and $R^{24}$ are methyl groups and $R^{25}$ is an ethyl group.

In EP0802222 there is described a method of improving the adhesion of a room temperature vulcanisable silicone composition comprising a polydiorganosiloxane having at least two alkoxy end groups, a cross linker, filler and a titanium catalyst, for example tetraalkoxy titanates such as tetraethoxy titanate and tetra isopropoxy titanate or chelated titanium compounds such as bis-acetylacetonyldiisopropoxy titanate, with 0.25 to 3 moles of monoketoester per mole of each titanium atom in the catalyst.

EP0747443, teaches the use of a catalyst according to the general formula $M[OR]_x[OR']_y$ where M represents a metal having a valency of 4 selected from Group IVB of the Periodic Table, x has a value from 0 to 0.60, y has a value from 3.40 to 4.0 and (x+y)=4, and R' represents a monovalent, tertiary or branched secondary aliphatic hydrocarbon group and R represents a monovalent linear aliphatic hydrocarbon group having 1 to 6 carbon atoms. The catalyst was preferably tetra (tertiary butoxy)titanate or tetra (tertiary amyloxy) titanate. Such a catalyst used for the preparation of silicone sealants was said to cause fast curing compositions, which do not yellow, without the need for a chelating agent.

The introduction of EP0747443, filed in June 1996, teaches that whilst an acetylacetonate may be mixed and/or reacted with the titanium compound to provide a complex as described in the prior art above, use of these resulting complexes as catalysts for curing silicone products inevitably results in a cured silicone product which has a yellow tint or discoloration.

The technology discussed above is particularly relevant to the preparation of room temperature cure sealants. When compared to well known room temperature vulcanisation oxime cure sealants, typical alkoxysilane cured sealant still have two significant problems, (1) a slower surface cure rate, and (2) a feeling of a residual surface tackiness after the period of time the surface is measured as "tack-free" using the standard Tack-Free-Time (TFT) test method (CTM 095A). Furthermore, possibly as a consequence of the overall mechanism of cure of the system (i.e. diffusion of moisture from the ambient atmosphere into the deep section of a sealant bead), the adhesion to some important substrates like floated glass panes does not build-up perfectly all along a sealant-substrate bond line. This phenomenon may suggest that the adhesive strength of the sealant to the glass is not strong enough for the glazing application envisaged. In the case of a glass or mill finished aluminium substrate, it has been found that with alkoxysilane cured sealants, after a period of 7 days curing the sealant is adhered to the substrate around the edges of a bead of sealant but no significant adhesion can be detected at the interface between the substrate and the centre of the bead. This phenomenon, which is a significant problem with respect to adhesion of, in particular, the above two substrates is generally termed as channel adhesion.

End users are known to consider that a sealant with a residual surface tackiness has several drawbacks, for example, it may be thought that the product will not cure completely and thereby, may lead to the, typically incorrect, belief that such a problem also causes poor bulk properties. Tacky surfaces are more prone to dirt pick up in a dusty environment such as in a factory.

Furthermore, whilst a solution to the problem of yellowing has been sought for many years and has been solved partially by EP0747443, it is still not known how to achieve the characteristics of desired speed of cure and adhesion build-up, particularly on glass and metals together with non yellowing with the titanium based catalyst systems.

The present invention seeks to provide an improved sealant based on alkoxy-functional curative/Group IV B metal ester catalyst by providing both an improved surface cure rate performance and the early adhesive bonding performance of the sealant on glass and typical metals like aluminium, copper and brass as used in the construction industry. It has also been found that contrary to the teaching of EP0747443 the addition of certain chelating agents to catalysts such as those described in EP0747443, results in alkoxysilane-cure silicone compositions which are curable at room temperature in the presence of atmospheric moisture at a desired rate and to a desired thickness and provide a translucent, "water white" cured products without the aesthetically unpleasant yellowing discoloration issue.

BRIEF SUMMARY OF THE INVENTION

The present invention provides in a first aspect a moisture curable composition capable of cure to an elastomeric body, the composition comprising:
A) a polymeric material having at least two groups, said groups in the polymeric material being the same and selected from the group consisting of:
  a) hydroxyl groups, and
  b) hydrolysable groups;
B) an alkoxysilane curing agent, and
C) a catalyst comprising a material selected from the group consisting of:
  (I) a mixture, and
  (II) a reaction product,
  of a compound selected from the group consisting of:
  (i) $M(OR)_4$,
  (ii) $M(OR')_x(Z)_z$
  wherein M is a metal having a valency of 4 selected from Group IVB of the Periodic Table, each R and R' is the same or different and is selected from the group consisting of
  (i') primary aliphatic hydrocarbon groups,
  (ii') secondary aliphatic hydrocarbon groups,
  (iii') tertiary aliphatic hydrocarbon groups, and (iv') —$SiR^9_3$, wherein each $R^9$ is an alkyl group having from 1 to 6 carbon atoms and Z is a group of the formula —O—Y—O— wherein Y is selected from the group consisting of:
  (i'') an alkylene group comprising from 1 to 8 carbon atoms and,
  (ii'') a branched alkylene radical comprising from 1 to 8 carbon atoms and x is 0 or 2, wherein when x is 0, z is 2 and when x is 2, z is 1: and
  (iii) a compound having the general formula:

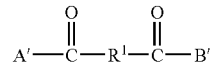

wherein $R^1$ is selected from the group consisting of:
  a') a methylene radical and
  b') substituted methylene radicals having from 1 to 6 carbon atoms,
wherein A' is selected from the group consisting of:
  (!) —$(CX_2)_nC(R^2)_3$ wherein n is from 0 to 5,
  (!!) an adamantyl group and
  (!!!) an adamantyl derivative;
B' is selected from the group consisting of:
  a'') —$(CX_2)_tC(R^2)_3$, wherein t has a value of from 0 to 5,
  b'') a monovalent alkyl group having from 1 to 6 carbon atoms, and
  c'') $OR^3$, wherein $R^3$ is selected from the group consisting of:
  a''') —$(CX_2)_tC(R^2)_3$ and
  b''') a monovalent alkyl group having from 1 to 6 carbon atoms,
wherein each X is the same or different and is selected from the group consisting of:
  $a^i$) a halogen radical and
  $a^{ii}$) hydrogen,
and each $R^2$ is the same or different and is selected from the group consisting of:
  $b^i$) a halogen radical and
  $b^{ii}$) an alkyl radical having one to eight carbon atoms, wherein when n is greater than 0, at least one of the X or $R^2$ is a halogen radical.

It is to be understood that the concept "comprising" where used herein is used in its widest sense to mean and to encompass the notions of "include", "comprehend" and "consist of".

DETAILED DESCRIPTION OF THE INVENTION

Regarding compounds (i) and (ii), for the avoidance of doubt the Group IVB elements of the Periodic Table in accordance with this invention are titanium (Ti), Zirconium (Zr) and Hafnium (Hf). Whilst M may represent any of the Group IVB elements, the preferred elements are titanium and zirconium.

Each R and R' group may be:
(i') any primary alkyl group having 1 to 6 carbon atoms for example, methyl, ethyl, butyl, propyl, pentyl or hexyl groups,
(ii') a secondary alkyl such as isopropyl, or
(iii') tertiary alkyl groups such as tertiary butyl ($C(CH_3)_3$) or tertiary amyl ($C(C_2H_5)(CH_3)_2$).

Alternatively R may be (iv') SiR$^9{}_3$, where each R$^9$ is an alkyl group having 1 to 6 carbon atoms such as methyl, ethyl, isopropyl, n butyl or tertiary butyl. In one preferred embodiment at least a majority and most preferably at least 75% of R or R' groups are tertiary alkyl groups. One example of an appropriate compound (i) is sold as Tyzor 9000 by Dupont and has the formula Ti[isopropoxy]$_{az}$[tertiary butoxy]$_{bz}$ where a is about 10% and b is about 90% and the total number of [isopropoxy]+[tertiary butoxy] groups per Ti atom is 4. The preparation of compounds of the above type is discussed in EP0747443.

When Z is —O—Y—O— each oxygen atom is bound directly to the Metal atom and x is about 2. Preferably Y is an alkylene group (i") or branched alkylene group (ii") containing 1 to 8 carbon atoms. Examples of the O—Y—O group may include 1,3-dioxypropane (O—(CH$_2$)$_3$—O), 2,4-dimethyl-2,4-dioxypentane (O—C((CH$_3$)$_2$)—CH$_2$—C((CH$_3$)$_2$)—O) and 2,3-dimethyl-2,3-dioxybutane (O—C((CH$_3$)$_2$)—C—((CH$_3$)$_2$)—O)

Regarding now compound (iii), preferably at least one and most preferably each X is a halogen radical. Most preferably the halogen radical is a fluorine radical. Similarly it is preferred that at least one and most preferably each R$^2$ group is a halogen radical and most preferably it is a fluorine radical or each R$^2$ group is an alkyl group, most preferably a methyl or ethyl or butyl group. In a most preferred formulation n is zero. R$^1$ is most preferably a methylene group but can have one alkyl or halogen substituted alkyl group with 1 to 5 carbon atoms. The adamantyl group is a derivative of adamantane or tricyclo-3,3,1,1-decane which is a rigid ring system based on three fused cyclohexane rings.

Preferably B' is c'''), where R$^3$ is b'''), a monovalent alkyl group having from 1 to 6 carbon atoms, most preferably R$^3$ is a methyl, ethyl or isopropyl group. When B contains a'''), i.e. —(CX$_2$)$_t$C(R$^2$)$_3$, t is preferably 1 or 0, most preferably 0.

Examples of compound (iii) include:

c$^i$) methyl pivaloylacetate (MPA), otherwise known as Pentanoic acid, 4,4-dimethyl-3-oxo-, methyl ester wherein each R$^2$ is a methyl group, n is zero, R$^1$ is a methylene group and B is OR$^3$ where R$^3$ is a methyl group. MPA has the following formula:

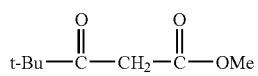

c$^{ii}$) Ethyl 4,4,4-trifluoroacetoacetate (TFA), otherwise known as Butanoic acid, 4,4,4-trifluoro-3-oxo-, ethyl ester and ethyltrifluoromethylacetoacetate wherein each R$^2$ is a fluoro group, n is zero, R$^1$ is a methylene group and B is OR$^3$ where R$^3$ is a ethyl group. TFA has the following formula:

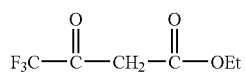

Compound (iii) may also be any one of the following:
Pentanoic acid 5,5,5,4,4-pentafluoro-3-oxoethyl ester, hereafter referred to as ethylpentafluoroethylacetoacetate has the formula C$_2$F$_5$—C(=O)—CH$_2$—C(=O)—O—C$_2$H$_5$
Dipivaloylmethane has the formula (CH$_3$)$_3$CC(=O)CH$_2$C(=O)C(CH$_3$)$_3$ Methyl-3-oxo-4,4-dimethylhexanoate has the formula

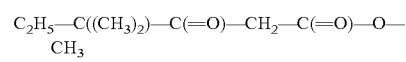

and ethyl-3-(1-adamantyl)-3-oxopropionate where A is an adamantyl group, R$^1$ is a methylene group and B is OR$^3$ where R$^3$ is an ethyl group.

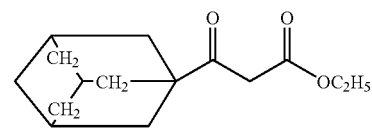

It is to be noted that the structures of compound (iii) are tautomeric and therefore the above structures are general and are in real terms a combination of tautomers

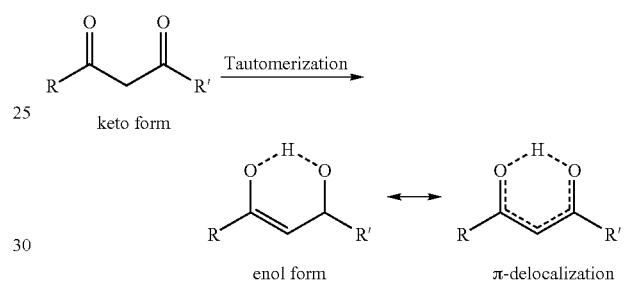

and it is this tautomerism which enables compound (iii) to become a chelate of M when mixed/reacted with compound (a) wherein tautomers of compound (iii) may replace any OR or OR'.

It has been found that the addition of ethylacetoacetate (EAA) to a titanium alkoxide generally causes a strong yellow discoloration upon ageing, however, the addition of compounds in accordance with compound (iii) above substantially removes this problem. It is suggested that such a difference may be as a result of the keto-enol equilibrium of such compounds. For example the ratio of the β-enol and β-diketo forms of EAA, MPA and TFA were determined by 1H NMR spectroscopy in deuterated benzene and are shown in the following Table.

| Compound | enol/diketo form ratio |
|---|---|
| EAA | 10/90 |
| MPA | 19/81 |
| TFA | 87/13 |

It would seem that the higher the degree of the enol form, the stronger the complexing strength of compound (iii) with compounds (i) and (ii). This in turn may provide a more stable chelated titanium ester species (titanate) and it would appear that the stability of the keto-enol form is a major factor in the discoloration (or not as the case may be) of resulting silicone sealant compositions.

Hence, preferred reaction products in accordance with this first aspect of the invention may be depicted as follows:

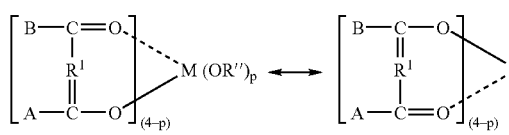

However it is to be understood that in most instances there will be present a mixture and/or reaction product of all different connotations of compounds (i) or (ii) with compound (iii) including unreacted (i) or (ii) and (iii) above, from where p is 0 to p is 4.

Similarly when Z is —O—Y—O— the reaction is preferably of the following tautomeric structure but typically will be a mixture and/or reaction product comprising all possible alternatives including unreacted compounds (i) or (ii) and (iii)

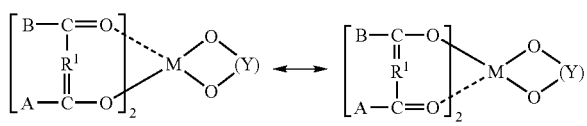

The molar ratio of compound (iii) to compound (i) or (ii) is preferably no greater than 4:1, more preferably the ratio is between about 0.5:1 and 2:1, but most preferably it is in the region of 1:1.

Examples of the main components of the reaction product/mixture may include:
di-tert-butoxytitanium bis(ethyl-3-oxo-4,4-dimethylhexanoate),
diisopropoxytitanium bis(methyl-3-oxo-4,4-dimethylhexanoate),
2,3-dimethyl-2,3-dioxybutanetitanium bis(methyl pivaloylacetate),
2-methyl-2,4-dioxypentanetitanium bis(methyl pivaloylacetate),
1,3-dioxypropanetitanium bis(methyl pivaloylacetate),
1,2-dioxyethanetitanium bis(methyl-3-oxo-4,4-dimethylhexanoate),
2,3-dimethyl-2,3-dioxybutanetitanium bis(methyl-3-oxo-4,4-dimethylhexanoate),
2-methyl-2,4-dioxypentanetitanium bis(methyl-3-oxo-4,4-dimethylhexanoate),
diisopropoxytitanium bis(ethyltrifluoromethylacetoacetate),
di-tert-butoxytitanium bis(ethyltrifluoromethylacetoacetate),
di-tert-butoxytitanium bis(methylpentafluoroethylacetoacetate),
diethoxytitanium bis(ethylpentafluoroethylacetoacetate),
2,3-dimethyl-2,3-dioxybutanetitanium bis(ethyltrifluoromethylacetoacetate),
2-methyl-2,4-dioxypentanetitanium bis(ethyltrifluoromethylacetoacetate),
1,3-dioxypropanetitanium bis(methylpentafluoroethylacetoacetate),
1,2-dioxyethanetitanium bis(ethylpentafluoroethylacetoaceate),
1,2-dioxyethanetitanium bis(methyltrifluoromethylacetoaceate),
1,3-dioxypropanetitanium bis(isopropyltrifluoromethylacetoaceate),
2-methyl-2,4-dioxypentanetitanium bis(ethylpentafluoroethylacetoacetate),
diisopropoxyzirconium bis(methylpivaloylacetate),
di(2-ethylhexoxy)zirconium bis(methylpivaloyloacetate),
di(n-butoxy)zirconium bis(methylpivaloyloacetate),
di(n-propoxy)zirconium bis(methylpivaloyloacetate),
di(n-butoxy)zirconium bis(methyl-3-oxo-4,4-dimethylhexanoate),
di(n-propoxy)zirconium bis(methyl-3-oxo-4,4-dimethylhexanoate),
diisopropoxyzirconium bis(ethyltrifluoromethylacetoacetate),
di-n-butoxyzirconium bis(ethyltrifluoromethylacetoacetate),
di-n-propoxyzirconium bis(ethyltrifluoromethylacetoacetate),
di-tertiary-butoxyzirconium bis(ethylpentafluoroethyl acetoacetate),
diisopropoxyzirconium bis(ethylpentafluoroethyl acetoacetate),
di-n-butoxyzirconium bis(ethylpentafluoroethylacetoacetate),
1,2-dioxyethanezirconium bis(methylpivaloyloacetate),
1,3-dioxypropanezirconium bis(methylpivaloyloacetate),
2,4-dimethyl-2,4-dioxypentanezirconium bis(ethylpivaloyloacetate),
2,3-dimethyl-2,3-dioxybutanezirconium bis(ethylpivaloyloacetate),
1,2-dioxyethanezirconium bis(ethyltrifluoromethyl acetoacetate),
1,3-dioxypropanezirconium bis(ethyltrifluoromethyl acetoacetate),
2,3-dimethyl-2,3-dioxybutanezirconium bis(ethyltrifluoromethyl acetoacetate),
2-methyl-2,4-dioxypentanezirconium bis(ethylpentafluoroethyl acetoacetate),
2-methyl-2,4-dioxypentanezirconium bis(ethyltrifluoromethyl acetoacetate),
di-tert-amyloxyzirconium bis(methylpivaloyloacetate),
di-tert-butoxyzirconium bis(ethyltrifluoromethylacetoacetate),
di-tert-amyloxyzirconium bis(ethyltrifluoromethylacetoacetate),
di-tert-amyloxyzirconium bis(ethylpentafluoroethylacetoacetate),
diisopropoxyzirconium bis(methylpivaloylacetate),
di(2-ethylhexoxy)zirconium bis(methylpivaloyloacetate) and
di(n-butoxy)zirconium bis(methylpivaloyloacetate).

In a composition according to the first aspect of the invention the polymeric material may be a polydiorganosiloxane a polyoxyalkylene, a polyacrylic, a polyisobutylene or a polyethylene or a mixture thereof. Preferably the polymeric material comprises not less than two groups bonded to silicon which are hydroxyl or hydrolysable groups. The polymer may be of the general formula W-Q-W where Q may be any desired organic material such as those mentioned above or a siloxane molecular chain for example a polyoxyalkylene chain or more preferably a polydiorganosiloxane chain and thus preferably includes siloxane units $R''_s SiO_{4-s/2}$ in which R'' represents an alkyl group having from 1 to 6 carbon atoms, a vinyl group or a phenyl group, or fluorinated alkyl group and s has a value of 0, 1 or 2. Preferred materials are linear materials i.e. s=2 for all units. Preferred materials have polydiorganosiloxane chains according to the general formula —$(R''_2SiO)_m$— in which each R'' represents an alkyl group, for example a methyl, ethyl or isobutyl group and m has a value from about 200 to about 1500. Suitable materials have viscosities of the order of about 500 mPa.s to about 200,000 mPa.s. The groups W of the polymeric material are a) hydroxyl or b) hydrolysable groups and may be the same or different. The W groups may be selected, for example, from $d^i$) —Si(R")$_2$OH, or $d^{ii}$) —Si(R")$_2$-(D)$_d$-R'"SiR"$_k$(OR$^5$)$_{3-k}$ where D is —R'"—(Si(R")$_2$—O)$_r$—Si(R")$_2$— and R" is as aforesaid, (and is preferably methyl), R'" is a divalent hydrocarbon group r is a whole number between 1 and 6 and d is 0 or a whole number, R$^5$ is f') an alkyl or f'') oxyalkyl group in which the alkyl groups have up to 6 carbon atoms and k has the value 0, 1 or 2. Preferably, R'" is either a methylene or ethylene group, k is 0 or 1 and R$^5$ is a methyl or ethyl group. Most preferably R'" is an ethylene group, k is 0 and R$^5$ is an ethyl group. Preferably at least one W group is a —Si(R")$_2$-(D)$_d$-R'"—SiR"$_k$(OR$^5$)$_{3-k}$ group. A small proportion of W groups may be (alkyl)$_3$Si— groups (where the alkyl groups are preferably methyl groups).

In a composition according to the invention the or each alkoxysilane curative is of the general formula R"$_{4-q}$Si(OR$^5$)$_q$ wherein R" and R$^5$ are as aforesaid and q has a value of 2, 3 or 4. Preferred silanes are those wherein R" represents methyl, ethyl or vinyl or isobutyl, R$^5$ represents methyl or ethyl and q is 3. Examples of operative silanes are methyltri (methoxy)silane (MTM), vinyltrimethoxysilane, methyltriethoxysilane, and vinyltriethoxysilane, isobutyltrimethoxysilane (iBTM). Other suitable silanes include ethyltrimethoxysilane, vinyltriethoxysilane, phenyltrimethoxysilane, and other such trifunctional alkoxysilanes as well as partial hydrolytic condensation products thereof. A sufficient amount of the chosen alkoxysilane curative(s) is/are employed to ensure adequate stability of the composition during storage and adequate crosslinking of the composition when exposed to atmospheric moisture.

Preferably the composition comprises 100 parts by weight of polymeric material, 0.1 to 20 parts by weight of alkoxysilane curative and 0.1 to 10 parts by weight of catalyst in the form of the mixture and/or reaction product defined above.

Compositions of this invention may contain as optional constituents other ingredients which are conventional to the formulation of silicone rubber sealants and the like. For example, the compositions will normally contain one or more finely divided, reinforcing or extending fillers such as high surface area fumed and precipitated silicas, crushed quartz, diatomaceous earths, calcium carbonate, barium sulphate, iron oxide, titanium dioxide and carbon black. The proportion of such fillers employed will depend on the properties desired in the elastomer-forming composition and the cured elastomer. Usually the filler content of the composition will reside within the range from about 5 to about 150 parts by weight per 100 parts by weight of the polymeric material.

Other ingredients which may be included in the compositions are pigments, plasticisers, agents (usually organosilicon compounds) for treating fillers, rheological additives for improving toolability of the composition, such as silicone glycols and adhesion improving substances, for example, γ-aminopropyltriethoxysilane alone or in combination with γ-glycidoxypropyltrimethoxysilane. One conventional ingredient which can be employed as a plasticiser to reduce the modulus of the cured elastomer is a polydimethyl siloxane having terminal triorganosiloxy groups wherein the organic substituents are e.g. methyl, vinyl or phenyl or combinations thereof. Such polydimethylsiloxanes normally have a viscosity of from about 100 to about 100,000 mPa.s at 25° C. and can be employed in amounts up to about 80 parts per 100 parts by weight of the polymeric material.

Alternative plasticisers may include organic plasticisers which will be well known to the person skilled in the art such as petroleum distillates.

A further additive which may be introduced into the system preferably at the same time as compound (iii) is (tertiary amyl) alcohol, this is particularly the case where compound (i) or (ii) comprises tertiary butyl or particularly isopropoxy groups as the isopropoxy groups are readily labile on hydrolysis and alcoholysis and are rapidly exchanged with the (tertiary amyloxy) groups. Hence, for example when compound (i) or (ii) is 2% by weight of Tyzor 9000, compound (ii) might be 0.1 to 1.0% by weight of TFA which could be added simultaneously with 0.2 to 0.5% by weight of (tertiary amyl) alcohol.

Also included within the scope of this invention are the cured elastomeric products of the said compositions and the use of such compositions for sealing joints, cavities and the like.

It has also been found that sealant compositions in accordance with the present invention avoid the problem of channel adhesion on glass and other substrates in particular mill finished aluminium, which substrates are particularly relevant to the glazing industry. It has been found that such channel adhesion problems are avoided by utilising a mixture/and/or reaction product in accordance with the current invention as a catalyst. It is thought that this may be because the mechanism of channel formation could be linked to the reactivity and fate of the titanate or the like catalyst (henceforth referred to as the titanate catalyst) in the sealant joint. For example the titanate could react rapidly with the surface to form glass-O—Ti bonds, these bonds gradually changing to glass-O—Si bonds. This supposition would indicate that a chelated titanate catalyst (i.e. compound (i)+compound (ii) herein) would have different adhesion properties to non-chelated titanate catalysts as the availability of the titanium atom would vary.

Additional additives which could be added to the composition of the present invention to reduce the effect of channel adhesion include acetoxysilanes such as for example di terbutoxodiacetoxysilane and ethyltriacetoxysilane, although it has been found that in the absence of a catalyst in accordance with the present invention such additives can cause a progressive yellow discoloration to the cured sealant. Other possible additives include an aliphatic diol having 1 to 6 carbon atoms such as 1,4-butane diol and low viscosity (35–45 centistokes) hydroxy terminated polydimethylsiloxane. Additives as described above may be added in an amount of up to about 5% by weight of the composition. The preferred amount of additive added is between 0.5 and 2.5% by weight most preferred between 0.75 and 2% by weight.

In a second aspect of the invention there is provided a catalyst composition for catalyzing a reaction between a polymeric material having not less than two hydroxyl or hydrolysable groups and an alkoxysilane curative said catalyst comprising the mixture/reaction product of claim 1 and an alkoxysilane or a tertiary amyl alcohol. The alkoxysilane may be as defined above for use as an alkoxysilane curative but is most preferably methyltrimethoxysilane. Typically the alkoxysilane of the catalyst is determined as a proportion of the total amount of alkoxysilane curative used in the moisture curable composition. However, it need not be the same as the alkoxysilane used specifically as a curative in the moisture curable composition.

The moisture curable composition in accordance with the first aspect of the invention may prepared by mixing the constituents in any order. The catalyst may be prepared by mixing compounds (i) or (ii) with compound (iii) and the resulting product being added to the polymer material and curative. However, it may also be prepared in an 'in-situ" form wherein at least one of the polymeric material or the curative may be pre-mixed with compound (i) or (ii) and/or compound (iii). A particularly preferred method of preparing the catalyst comprises mixing the alkoxysilane curative or alternatively a tertiary amyl alcohol with compound (i) or (ii) and adding compound (iii) simultaneously with or subsequent to compound (i) or (ii). The resulting catalyst composition is then added into the polymer material and alkoxysilane mixture. This latter method is particularly useful with respect to the preparation of zirconium based catalysts as in particular zirconium based versions of compound (i) or (ii) tend to be relatively unstable. Typically compound (i) or (ii) is first added to the alkoxysilane cross-linker, followed by compound (iii), the chelating agent, which is added gradually under agitation. A slight exotherm may be observed due to the exchange reaction between the alkoxy groups (leaving the metal atom) and the chelating agent. Any appropriate equipment may be utilised, examples include any glass vessel or the like.

A further alternative method of making the composition comprises for example, adding compound (i) or (ii) and compound (iii) or a mixture/reaction product thereof into a mixture of the polymeric material and the curative alkoxysilane. However, it is also possible to add compound (i) or (ii) to the polymeric material and the curative alkoxysilane, mixing the three together and then finally adding compound (iii).

Any optional additional ingredients, other than the filler, may be incorporated at any stage of the mixing operation but are preferably added after the catalyst is formed. Compound (i) or (ii) and the curative silane must however be added to the polymer prior to introduction of any filler, but compound (iii) may be added either before, simultaneously or after the introduction of the filler.

After mixing, the compositions may be stored under substantially anhydrous conditions, for example in sealed containers, until required for use.

Compositions according to the invention may be formulated as single part formulations which are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures. They have desired cure properties to provide cured seals of modulus sufficiently low for most industry standards and elongation to break which is sufficiently high for most industry standards.

EXAMPLES

In order that the invention may become more clear there now follows a description of example sealant compositions selected for description to illustrate the invention by way of example. In the description all compositions are expressed by weight % and all viscosities are at 25° C. unless otherwise indicated.

Example 1

Table 1 shows the results of a series of tests which compare the use of various catalysts (C). The titanates used as compound (i) or (ii) are colourless and active for curing ethylenetriethoxysilyl end-capped polydimethylsiloxane (ETE) polymers. A composition consisting of 93% by weight ETE polymer, 5% by weight methyltrimethoxysilane (MTM) curative and 2% by weight of the mixture and/or reaction product was prepared and supplied into an appropriate retaining tube. The resulting sealant composition was aged for approximately two weeks in their respective tubes before evaluating the curing properties known as Skin over time (SOT) and Tack free time (TFT). Skin over time (SOT), represents the amount of time the end-user can take to tool his sealant joint to its final shape and was determined as the period of time during which the surface of an applied bead of the composition could be tooled or worked. Skin-Over-Time was measured by spreading the material to form a layer 0.32+/−0.08 cm thick on a clean smooth non porous surface. The sample was exposed to a relative humidity (RH) of 50% at 25° C. and at one minute intervals the surface was lightly touched with a finger tip and the finger slowly drawn away. This was repeated every minute until the sample did not adhere to the finger tip. The time in minutes elapsed from spreading the material until the surface did not adhere to the finger tip was recorded as Skin-Over-Time. Tack free time (TFT), reflects the amount of time after which the sealant surface will no longer pick up dirt and was determined as the period of time elapsed between the extrusion of a bead of the composition and when the surface was no longer tacky to the touch. Tack-Free-Time was measured by spreading the material 2 mm thick on a clean smooth non porous surface.

The sample was exposed to 50% RH at 22° C. At intervals of 5 minutes or less a clean polyethylene strip was laid on a fresh surface of the sample and gently pulled off. The time in minutes elapsed between spreading the sample and when the strip pulled away cleanly from the surface was recorded as the Tack-Free-Time.

It is to be noted that the use of the reaction products of tetra (tertiary butoxy) titanate and MPA or TFA resulted in faster composition cure rates when compared reaction products based on the tetra isopropoxy titanate or the tetra n-butoxy titanate. In addition to faster cure rate it was noted that curing with the tetra (tertiary butoxy) titanate catalysts resulted to significantly less discoloration. Hence it would seem that compositions containing reaction products of (tertiary butoxy) titanate require smaller amounts of compound (iii) in order to provide an active catalyst for the relevant compositions. Hence the molar equivalent of chelate against titanium atom can be maintained below or around 1.0 molar equivalent for such reaction products which, it is thought, assists in the prevention of discoloration with ageing of the cured composition.

When MPA was used as compound (iii) a very slight discoloration was noticed on occasion in cases where the amount of MPA used was >1.0 molar equivalent. No discoloration was observed in any curing or ageing situation when using TFA as compound (iii). In comparison a similar composition prepared using ethyl acetoacetate (EAA) instead of compound (iii) produced an immediate yellowing discoloration upon curing which persisted throughout the shelf life of the composition.

TABLE 1

Activity of chelated titanate compounds.
Compound (i) being of the formula M[OR]₄

| ID# | Compound (iii) | R group | Compound (i)/Compound (iii) mole ratio | SOT (min) | TFT (min) |
|---|---|---|---|---|---|
| 1 | MPA | R = isopropyl | 1.0/0.5 | 23 | 38 |
| 2 | " | " | 1.0/1.0 | 17 | 28 |
| 3 | " | " | 1.0/1.5 | 17 | 28 |
| 4 | " | R = n-butyl | 1.0/0.5 | 18 | 42 |
| 5 | " | " | 1.0/1.0 | 12 | 19 |
| 6 | " | " | 1.0/1.5 | 12 | 19 |
| 7 | " | R' = tert-butyl | 1.0/0.5 | 6 | 12 |
| 8 | " | " | 1.0/1.0 | 8 | 13 |
| 9 | " | " | 1.0/1.5 | 19 | 31 |
| 10 | TFA | R = isopropyl | 1.0/0.5 | 36 | 60 |
| 11 | " | " | 1.0/1.0 | 27 | 39 |
| 12 | " | " | 1.0/1.5 | 32 | 45 |
| 13 | " | R = n-butyl | 1.0/0.5 | 39 | 60 |
| 14 | " | " | 1.0/1.0 | 23 | 38 |
| 15 | " | " | 1.0/1.5 | 36 | 48 |
| 16 | " | R = tert-butyl | 1.0/0.5 | 16 | 28 |
| 17 | " | " | 1.0/1.0 | 20 | 34 |
| 18 | " | " | 1.0/1.5 | 27 | 39 |

Example 2

A Masterbatch sealant composition was prepared by mixing 63 parts of a polymer, an ethylenetriethoxysilyl endcapped polydimethylsiloxane having a viscosity of 110000 centistokes, 20 parts of a polydimethylsiloxane fluid plasticiser having a viscosity of 100 centistokes, 2.2 parts of a methyltrimethoxysilane (MTM, curative 1) and 2.2 parts of isobutyltrimethoxysilane (iBTM, curative 2), 2.2 parts of Tyzor 9000 (compound (i)), 10.7 parts of a fumed silica filler (LM 150), 2 parts by weight of a silicone glycol rheology additive, 1.2 parts by weight of an amino-epoxysilane adhesion promoter and 0.3 parts of a fungicide, 10,10'-oxy-bisphenoxarsine in propylene-glycol (1000 MW, sold as Vinyzene BP55) at room temperature in absence of moisture. The above masterbatch was used as the basis of the following tests.

Samples were prepared using a 5 L batch mixer equipped with a planetary dispersing device and a vacuum line (DRAIS). In a first step, polymer and two thirds of the plasticiser were mixed together, followed by the addition of a premix slurry, consisting of the curatives, compound (i) and where used compound (iii). The filler was subsequently incorporated by step addition and the resulting mixture was dispersed for about 15 minutes. Subsequent to the dispersion stage the rheology additive, the adhesion promoter and the fungicide were then added together with the residual plasticiser. The final composition was stripped at the end of the compounding process for about three minutes prior to packaging the sealant into typical 310 ml polyethylene cartridges. The composition was then matured for about a week in its packaging under ambient conditions of the lab before testing.

SOT and TFT tests were run as described in Example 1. The colour was measured by visual evaluation with the sample retained between glass plates against a white surface in order to emphasise the "water white" (in the Tables "clear" signifies "colourless" or "water white") colour of the illustrative examples and the yellowish discoloration comparison using EAA. Samples were analysed both after initial room temperature cure and after ageing for 4 weeks at 50° C. in a cartridge.

A strong yellow discoloration was observed when the EAA comparative composition was analysed. The discoloration was seen both upon initial mixing and ageing of the composition. Slight discoloration was noticed for reaction products in accordance with the first aspect of this invention having the highest compound (iii): compound (i) molar equivalence for both MPA and TFA when stored for four weeks at 50° C. However, it was further noted that no further discoloration was recorded for any of the sealant compositions after two months storage at room temperature.

Furthermore, when MPA was compound (iii) it was noticed that as the ratio of MPA: Compound (i) increased there was a gradual increase in value of SOT, and decrease in the TFT. Ideally, a sealant will have a sufficiently long SOT value, and a sufficiently short TFT in order to provide the most appropriate ease of use for sealing applications. Similar results were noted when TFA was used as compound (iii) up until approximately 0.8 molar equivalent of TtBT.

TABLE 2

Post Addition of Compound (ii)

| Composition | Comparative 1 | Example 1 | Example 2 | Example 3 | Example 4 | Example 5 | Example 6 | Comparative 2 |
|---|---|---|---|---|---|---|---|---|
| Polymer | 60.70% | 60.50% | 60.50% | 60.20% | 60.40% | 60.20% | 59.70% | 60.50% |
| Plasticiser | 19.30% | 19.20% | 19.20% | 19.10% | 19.20% | 19.10% | 19.00% | 19.20% |
| Cross-Linker 1 | 2.10% | 2.10% | 2.10% | 2.10% | 2.10% | 2.10% | 2.10% | 2.10% |
| Cross-Linder 2 | 2.10% | 2.10% | 2.10% | 2.10% | 2.10% | 2.10% | 2.10% | 2.10% |
| TtBT catalyst | 2.10% | 2.10% | 2.10% | 2.10% | 2.10% | 2.10% | 2.10% | 2.10% |
| Silica | 10.30% | 10.30% | 10.30% | 10.20% | 10.30% | 10.20% | 10.10% | 10.30% |
| Rheology Additive | 1.90% | 1.90% | 1.90% | 1.90% | 1.90% | 1.90% | 1.90% | 1.90% |
| Adhesion Promotor | 1.20% | 1.20% | 1.20% | 1.10% | 1.20% | 1.10% | 1.10% | 1.20% |
| Fungicide | 0.30% | 0.30% | 0.30% | 0.30% | 0.30% | 0.30% | 0.30% | 0.30% |
| Compound iii - level | | 0.24% | 0.39% | 0.77% | 0.41% | 0.82% | 1.63% | 0.25% |
| Compound iii - type | | MPA | MPA | MPA | TFA | TFA | TFA | EAA |
| Total w % | 100% | 100% | 100% | 100% | 100% | 100% | 100% | 100% |
| Compound iii mole equiv. | 0 | 0.27 | 0.44 | 0.88 | 0.36 | 0.72 | 1.44 | 0.31 |
| SOT min | 5 | 5 | 7 | 8 | 7 | 12 | 16 | 11 |
| TFT min | 40 | 16 | 11 | 9 | 16 | 14 | 24 | 33 |
| Adhesion | | | | | | | | |
| Finger test glass (% CF) | 50 | 75 | 100 | 100 | 90 | 100 | 100 | |
| Discolouration visual | | | | | | | | |

TABLE 2-continued

| | Post Addition of Compound (ii) | | | | | | | |
|---|---|---|---|---|---|---|---|---|
| Composition | Comparative 1 | Example 1 | Example 2 | Example 3 | Example 4 | Example 5 | Example 6 | Comparative 2 |
| after initial RT | none | none | none | none | none | none | none | yellow |
| after 4w50c in cartr | none | none | none | slight | none | none | slight | yellow |

The channel adhesion effects were analysed using a cohesive failure based test wherein each glass substrate was wiped with a 50/50 weight % solution of isopropanol and water and dried. The sealant composition was applied as a 12 mm bead which was tooled to provide a bead of 0.5 mm in depth. The composition was allowed to cure for either 4 or 7 days and then one end of the cured bead was undercut with a razor blade and pulled at 90° and the % of cohesive failure as a measure of the adhesion build-up was determined in accordance with the following formula:

$$\frac{\text{width of cohesive failure in the centre of the bead}}{\text{total width of the joint}} \times 100$$

Example 3

In this example a comparison is provided between the basic masterbatch as described in example 2 and a composition wherein compound (iii) in the form of TFA is added into a premix comprising the curatives (MTM and iBTM), compound (i), TtBT, and compound (iii) in the desired molar amount. After compounding the sealant, and allowing it to rest in its packaged form for a week, curing, adhesive bonding, aesthetic and general physical properties were evaluated and it will be noted that the results relating to the composition in accordance with the current invention significantly improved over the comparative example.

For these sealant compositions, the residual surface tackiness (RST) was assessed after periods of six and 24 hours curing under ambient conditions using either a TA.XT2i Texture Analyzer or by touching the cured sample with either a hand or fingers. The texture analyzer instrument provided quantitative measurements of the tackiness by measuring the force needed to extract a given probe from the surface using the following method:

A cylindrical ebonite probe of 1.27 cm (0.5 inch) diameter is moved at a speed of 1 mm s$^{-1}$ towards the surface of a 2 mm deep sheet of sealant. A constant load of 3 Newton was applied on the surface for 5 seconds. The probe was then pulled away from the surface at a constant rate of 10 mm s$^{-1}$ until the probe was detached from the sealant surface. The peak force was measured and the resulting measurement corresponded to the adhesive strength or tack of the sealant under the test conditions i.e. the curing time and conditions—Relative Humidity/Temperature, applied and duration of the load.

Cure in depth (CID) was determined as the thickness in mm of the composition which was found to have cured to an elastomeric state during ageing at ambient temperature and humidity for a specified period.

Modulus 100% (MPa), Elongation at Break (%), Tensile Strength (MPa) and tear strength (kN/m) were measured using a moulded and cured standard test slab 2 mm thick of each composition which had been cured by exposure to atmosphere at room temperature on a flat surface for at least 7 days. Tear strips were cut from the cured sample and stretched to breakpoint in a tensometer and the various measurements recorded.

The Adhesion and coloration testing were undertaken as previously described and the results are indicated in Table 3.

TABLE 3

| Full Compounding of Sealant including TFA (compound (ii)) into the Premix Slurry | | | |
|---|---|---|---|
| Composition | | Comparative Weight % | Example Weight % |
| Polymer | | 60.7 | 60.1 |
| Plasticiser | | 19.3 | 19.1 |
| PREMIX | | | |
| Cross Linker 1 | | 2.1 | 2.1 |
| Cross Linker 2 | | 2.1 | 2.1 |
| Compound i | Level | 2.1 | 2.1 |
| | Type | TtBT | TtBT |
| Compound iii | Level | | 0.99 |
| | Type | | TFA |
| Silica | fumed 150 m2/g | 10.3 | 10.2 |
| Rheology Additive | | 1.9 | 1.9 |
| Adhesion Promotor | | 1.2 | 1.1 |
| Fungicide | | 0.3 | 0.3 |
| | Total w % | 100 | 100 |
| Compound i/Compound iii | mole equiv. | 0 | 0.87 |

TABLE 3-continued

Full Compounding of Sealant including TFA (compound (ii)) into the Premix Slurry

| Composition | | Comparative Weight % | Example Weight % |
|---|---|---|---|
| Curing Tests | | | |
| SOT | min | 5 | 10 |
| FTF | min | 42 | 29 |
| Residual Surface Tack | Peak Force at 6 hrs (N) | 9.2 | 6.3 |
| | HAND feeling | tacky | dry |
| | Peak Force at 24 hrs (N) | 6.8 | 2.2 |
| | HAND feeling | tacky | dry |
| CID | mm/24 hrs@21 C.; 54% RH | 2.4 | 2.2 |
| | mm/72 hrs@21 C.; 54% RH | 3.9 | 4 |
| Physical Properties | 2 mm sheet, 1 week cure @ RH | | |
| Tensile strength | Mpa | 1.58 | 2.33 |
| MOD 100% | MPa | 0.36 | 0.41 |
| E Break | % | 533 | 753 |
| Tear Strength | kN/m | 4.63 | 5.54 |
| Adhesion | | | |
| Finger test | glass (% CF) | 20 | 100 |
| Discolouration Visual | | | |
| Initial RT | | none | none |
| after 4w50C in cartr. | | none | none |

Example 4

Table 4 shows a comparison of results wherein compound (i) in the form of Tyzor 9000 has been used as sole catalyst as well as in combination with (tertiary amyl) alcohol alone and in combination with (tertiary amyl) alcohol and TFA. It is to be noted that the addition of (tertiary amyl) alcohol alone provides an improved SOT and TFT results and particularly in relation to residual surface tackiness. However, the best results seem to be obtained when (tertiary amyl) alcohol and TFA are added in combination as the resulting product has a short TFT and RST an increased SOT and 100% cohesive failure to glass without any discoloration problem in the resulting sealant.

Example 5

In examples 5 to 7 the tack free time (TFT) was measured using an alternative method as described below:

The curable composition of the present invention was used to coat a substrate (PET film) in a thickness of approximately 3 mm, a polyethylene film was placed over this at 20° C. and a relative humidity of 55%, a weight of 30 g was placed on this for 30 seconds, the polyethylene film was then peeled off, and the TFT was measured as the time it took until the curable composition no longer adhered (time elapsed after coating).

For the first 10 minutes from the start (elapsed time: 0 minutes), measurements were made every minute (the polyethylene film was peeled off every time 1 minute elapsed; the same applies hereinafter), then every 2 minutes during the period from 10 to 20 minutes of elapsed time, and finally every 5 minutes during the period from 20 to 160 minutes of elapsed time.

TABLE 4

| | | Weight % | Weight % | Weight % | Weight % |
|---|---|---|---|---|---|
| Polymer | | 60.7% | 60.5% | 60.4% | 61.1% |
| Fluid | | 19.3% | 19.2% | 19.2% | 19.4% |
| Cross-Linker 1 | | 2.1% | 2.1% | 2.1% | 2.1% |
| Cross-Linker 2 | | 2.1% | 2.1% | 2.1% | 2.1% |
| Compound i | | 2.1% | 2.1% | 2.1% | 2.1% |
| | | Tyzor 90 | Tyzor 90 | Tyzor 90 | Tyzor 90 |
| Co-catalyst additive 1 | | | 0.27% | 0.55% | 0.28% |
| | | | tAmOH | tAmOH | tAmOH |
| Compound iii | | | | | 0.17% |
| | | | | | TFA |
| Rheology Additive | | 1.9% | 1.9% | 1.9% | 1.9% |
| Silica | | 10.3% | 10.3% | 10.3% | 10.4% |
| Adhesion Promotor | | 1.2% | 1.2% | 1.1% | none |
| Fungicide | | 0.3% | 0.3% | 0.3% | 0.3% |
| PHYSICAL PROPERTIES @ RT AGED COMPOSITION | | | | | |
| SOT | min | 11 | 7 | 23 | 16 |
| TFT | min | 42 | 30 | 63 | 21 |

TABLE 4-continued

|  |  | Weight % | Weight % | Weight % | Weight % |
|---|---|---|---|---|---|
| Residual Surf T | average 6 hours | 9.2 | 9.0 | 9.4 | 9.8 |
|  | HAND feeling (0 = be) | 2 | 1 | 1 | 1 |
| Residual Surf T | average 24 hours | 6.8 | 6.9 | 6.2 | 3.5 |
|  | HAND feeling (0 = be) | 2 | 1 | 1 | 1 |
| CID | mm/24 hrs @ 21 C.; 54 | 2.4 | 2.9 | 2.6 | 2.6 |
|  | mm/72 hrs @ 21 C.; 54 | 3.9 | 4.0 | 3.7 | 4.2 |
| Weight loss | weight % @ 150 C./3 h 2 mm sheet, 1 week cure @ RT | 2.55 | 2.51 | 2.69 | 3.01 |
| Tensile strength | MPa | 1.58 | 1.56 | 1.46 | 2.00 |
| MOD100% | MPa | 0.36 | 0.38 | 0.32 | 0.33 |
| EBreak | % | 533 | 520 | 540 | 654 |
| Hard | ShA | 10 | 11 | 8 | 9 |
| Tear strength | kN/m | 4.63 | 5.55 | 5.03 | 5.64 |
| Adhesion |  |  |  |  |  |
| Finger test | Glass (% CF) | 20 | 20 | 40 | 100 |
| Colour (visual) | Initial RT | Transp. | Slight Y Yellow | Transp. | Transp. |
|  | After 4w50C in car | Transp. | Transp. | Transp. | Transp. | finally every 5 minutes during the period from 20 to 160 minutes of elapsed time.

Samples 5.1 to 5.4 were prepared by uniformly mixing 2 mass parts of a zirconium catalyst as shown in Table 5(a), 100 mass parts of a dimethylpolysiloxane expressed by the formula $(C_2H_5O)_3Si-CH_2CH_2-SiMe_2-O-(SiMe_2O)_x-SiMe_2-CH_2CH_2-Si(OC_2H_5)_3$ having a viscosity at 25° C. of 20,000 mPa s, and 2.5 mass parts methyltrimethoxysilane.

The resulting samples were stored in a sealed glass bottle at a temperature of 50° C., for a period of 14 days. The samples were periodically checked for discoloration and transparency and the tack free time (TFT) was also measured in order to check for curability.

The test results are given in Table 5(a) below.

TABLE 5(a)

| Zirconium catalyst used | 5.1 | 5.2 | 5.3 | 5.4 |
|---|---|---|---|---|
| $Zr(CF_3C(=O)CH_2C(=O)CF_3)_4$ | ○ | — | — | — |
| $Zr(Me_3CC(=O)CH_2C(=O)CMe_3)_4$ | — | ○ | — | — |
| $Zr(CF_3C(=O)CH_2C(=O)CMe_3)_4$ | — | — | ○ | — |
| $Zr(CF_3C(=O)CH_2C(=O)CH_3)_4$ | — | — | — | ○ |
| Test for discoloration in curable silicone composition | Discoloration after storage for 14 days at 50° C. dark discoloration: x light discoloration: ○ no discoloration: ⊕ | ⊕ | ⊕ | ⊕ | ⊕ |

As is clear from Table 5(a), no discoloration or deterioration in transparency was observed over time in any of the samples. As to curability, the tack free time in every case was under 60 minutes.

Samples 5.5 to 5.7

Compounds expressed by the following formula were prepared by reacting $(isopropoxy)_4Zr$ and $CF_3C(=O)CH_2C(=O)OC_2H_5$ in various proportions, and samples were otherwise produced in the same manner as in Example 1.

Changes in color and transparency over time and the tack free time after storage were measured.

These results are given in Table 5(b).

TABLE 5(b)

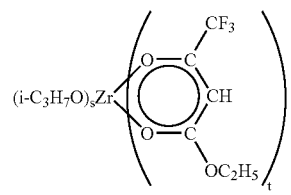

|  |  | Initially |  | After 4 months aging at 50° C. |  |
|---|---|---|---|---|---|
| No. | Color | Transparency | Discoloration | Transparency | Tack free time (min) |
| 5.5 | s = 2, t = 2 colorless | good | none | good | 34 |
| 5.6 | s = 1, t = 3 colorless | good | none | good | 47 |
| 5.7 | s = 0, t = 4 colorless | good | none | good | 60 |

Sample 5.8

Di(isopropoxy)zirconium bis(methylpivaloylacetate) was prepared by reacting tetra(isopropoxy)Zirconium and methyl pivaloylacetate. The sample was prepared in the same manner as samples 5.1 to 5.4, but using the above compound, and changes in color, transparency over time, and tack free time after storage were measured. The initial sample was colorless and had good transparency. After 4 months of aging at 50° C. there was no discoloration, the transparency was still good, and the tack free time was 75 minutes.

Samples 5.9 to 5.12 and Comparative Example (CE1)

Samples were prepared by mixing 100 mass parts polydimethylsiloxane A, 3 mass parts methyltrimethoxysilane, 3 mass parts of the chelate zirconium compound shown in Table 5(c) below, 12 mass parts filler, and 0.5 mass parts of an adhesion promoter. Each sample was sealed in a glass bottle for storage, the change in color and the transparency after curing (24 hours at room temperature) were checked, and the tack free time was measured. The test results are given in Table 5(c).

Polydimethylsiloxane A was manufactured by the following method.

100 mass parts of a polydimethylsiloxane capped at both ends of the chain with hydroxyl groups (viscosity at 25° C.: 70 mPa.s) was heated to 185° C. and added to a mixture of 2.4 mass parts of a polydimethylsiloxane (viscosity at 25° C.: 10 mPa.s) having SiH groups at the ends and containing 0.16 mass % SiH bonds and 0.6 mass part of a polydimethylsiloxane capped at both ends of the chain with trimethylsilyl groups (viscosity at 25° C.: 10 mPa.s). A dichloromethane solution of PNCl (phosphonitrile chloride, 20 ppm by weight of the above-mentioned hydroxyl-terminated polydimethylsiloxane) was added to this system. Heated air was passed through the mixture, which initiated a polycondensation reaction and an equilibrium reaction while the water was removed from the system. Upon completion of the reaction, the system was cooled to 50° C., hexamethylcyclosilazane was added in an amount corresponding to 1000 ppm (weight) with respect to the weight of the above-mentioned hydroxyl-terminated polydimethylsiloxane to neutralize the PNCl. To 100 mass parts of the reaction product thus obtained was added 1.08 mass parts vinyltriethoxysilane, and these components were reacted in the presence of a platinum complex of divinyltetramethyidisiloxane (0.12 mass part). The product was a polydimethylsiloxane that had a viscosity at 25° C. of 20,000 mPa.s, 70% of the end groups were $(C_2H_5O)_3SiCH_2CH_2-$ groups, and the other 30% were $(CH_3)_3Si-$ groups.

TABLE 5(c)

| Sample | Chelate zirconium compound | Color Start 7 days/0° C. 35 days/50° C. | TFT (min) 35 days/50° C. | Transparency 35 days/50° C. |
|---|---|---|---|---|
| 9 | di(n-butoxy)zirconium bis(methylpivaloylacetate) | ← colorless, transparent → | 58 | good |
| 10 | di(n-butoxy)zirconium bis(ethyltrifluoromethylacetate) | ← colorless, transparent → | 60 | good |
| CE1 | di(n-butoxy)zirconium bis(ethylacetoacetate) | ← pale yellow color → | 110 | turbidity |

| Sample | Chelate zirconium compound | Color Start 7 days/50° C. 35 days/50° C. | TFT (min) 35 days/50° C. | Transparency* 35 days/50° C. |
|---|---|---|---|---|
| 11 | 2,3-dimethyl-2,3-dioxybutanezirconium bis(ethylpivaloyacetate) | ← colorless, transparent → | 60 | good |
| 12 | 2-methyl-2,4-dioxypentanezirconium bis ethyltrifluoromethylacetoacetate) | ← colorless, transparent → | 75 | good |

*Transparency after curing (24 hours at room temperature)

Samples 5.13 to 5.18 were prepared by mixing 100 mass parts polydimethylsiloxane A, 3 mass parts methyltrimethoxysilane, 3 mass parts of the zirconium catalyst shown in Table 5(d) below, 12 mass parts silica filler (RTDX130, made by Aerosil), and an adhesion promoter (25% aminopropyltrimethoxysilane and 75% gamma-glycidoxytrimethoxysilane). The change in color and the transparency after curing (24 hours at room temperature, and made into a test piece measuring 2 mm thick, 2 cm long, and 2 cm wide) were checked, and the tack free time was measured. The test results are given in Table 5.d.

TABLE 5(d)

| | Chelate zirconium compound | Color Start 14 days/50° C. | TFT (min) Start 14 days/50° C. | Transparency after curing 14 days/ 50° C. |
|---|---|---|---|---|
| 13 | di(n-butoxy)zirconium bis(methylpivaloylacetate) | ← colorless, transparent → | 40 47 | good |
| 14 | di(n-butoxy)zirconium bis (ethyltrifluoromethylacetoacetate) [structure: n-$C_4H_9O$, n-$C_4H_9O$ bonded to Zr, with chelate ring containing $CF_3$, O, CH, O, $OC_2H_5$, subscript 2] | ← colorless, transparent → | 55 51 | good |
| 15 | Tetra(ethyltrifluoromethyl acetoacetate) zirconium [structure: Zr with four chelate ligands containing $CF_3$, O, CH, O, $OC_2H_5$, subscript 4] | ← colorless, transparent → | 55 49 | good |
| 16 | di(i-propoxy)zirconium bis(methylpivaloylacetate | ← colorless, transparent → | 35 34 | good |
| 17 | di(i-propoxy)zirconium bis (ethyltrifluoromethylacetoacetate) [structure: i-$C_3H_7O$, i-$C_3H_7O$ bonded to Zr, with chelate ring containing $CF_3$, O, CH, O, $OC_2H_5$, subscript 2] | ← colorless, transparent → | 25 42 | good |
| 18 | di(n-butoxy)zirconium bis(pivaloylmethane) | ← colorless, transparent → | 60 58 | good |

Examples 5.19 to 5.22

Samples were prepared by mixing 100 mass parts polydimethylsiloxane A, 3 mass parts methyltrimethoxysilane, and 3 mass parts of the zirconium catalyst shown in Table 5(e) below. The change in color and the transparency after curing were checked, and the tack free time was measured. The test results are given in Table 5.

TABLE 5(e)

| | Chelate zirconium compound used | Color Start | 21 days/ 50° C. | TFT (min) | Transparency after curing |
|---|---|---|---|---|---|
| Ex 19 | di(t-butoxy)zirconium bis(methylpivaloylacetate) | colorless, transparent | colorless, transparent | 30 | good |
| Ex 20 | di(t-amyl)zirconium bis(methylpivaloylacetate) | colorless, transparent | colorless, transparent | 28 | good |
| Ex 21 | di(t-amyl)zirconium bis(ethyltrifluoromethyl acetoacetate) 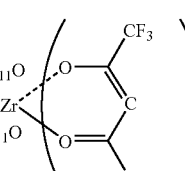 | colorless, transparent | colorless, transparent | 35 | good |
| Ex 22 | di(t-amyl)zirconium bis(pivaloylmethane) | colorless, transparent | colorless, transparent | 55 | slight turbidity |

Example 6

The polydiorganosiloxane B used in the following examples and comparative examples is expressed by the formula $(C_2H_5O)_3Si$—$CH_2CH_2$—$SiMe_2$—O—$(SiMe_2O)_x$—$SiMe_2$—$CH_2CH_2$—$Si(OC_2H_5)_3$, and is a polydimethylsiloxane whose viscosity at 25° C. is 20,000 mPa.s.

Samples 6.1 to 6.12 and Comparative Examples CS6.1 to CS6.3 were prepared by first preparing the catalyst by mixing the various tetraorganotitanates and ketone compounds shown in Table 6(a) (in the molar ratios indicated in the Table) for 3 hours at room temperature. 2.15 mass parts of the resulting catalysts which were thus obtained were each mixed with polydiorganosiloxane B (100 mass parts) and an alkoxysilane curative (5.37 mass parts) to produce a sample.

The resulting samples were stored at 50° C. for 28 days in a sealed glass bottle after which they were checked for discoloration over time, transparency and the tack free time (TFT) was measured in order to check curability.

The test results are given in Table 6(a) below

As is clear from Table 6(a), samples 6.1 to 6.9, prepared using a titanium catalyst with a methyl pivaloylacetate chelate, were all colorless from the outset, and no discoloration or loss of transparency was seen over time. An appropriate level of curability, was maintained in all cases.

In Samples 6.10 and 6.11, in which dipivaloylmethane was used in place of the methyl pivaloylacetate, the results were the same as in the above-mentioned examples. The same results were also obtained in sample 12, in which ethyl-3-(1-adamantyl)-3-oxopropionate was used in place of the methyl pivaloylacetate. In contrast, in each of the samples CS1 to CS3 were observed to be discolored from the outset, and transparency was seen to deteriorate.

TABLE 6(a)

| | | CS 6.1[1] | 6.1 | 6.2 | 6.3 | 6.4 | 6.5 | 6.6 | 6.7 | 6.8 | 6.9 | 6.10 | 6.11 | 6.12 | CS 6.2[1] | CS 6.3[1] |
|---|---|---|---|---|---|---|---|---|---|---|---|---|---|---|---|---|
| Tetra-organo-titanate | tetraisopropoxytitanium | 1 | 1 | 1 | 1 | | | | | | | 1 | | 1 | 1 | 1 |
| | tetrabutoxytitanium | | | | | 1 | 1 | 1 | | | | | | | | |
| | tetra-tert-butoxytitanium | | | | | | | | 1 | 1 | 1 | | 1 | | | |
| Ketone compound | ethyl acetoacetate | 2 | | | | | | | | | | | | | | |
| | methyl pivaloylacetate | | 2 | 1 | 0.5 | 2 | 1 | 0.5 | 2 | 1 | 0.5 | | | | | |
| | dipivaloylmethane | | | | | | | | | | | 2 | 2 | | | |
| | ethyl-3-(1-adamantyl)-3-oxopropionate | | | | | | | | | | | | | 2 | | |
| | ethyl benzoylacetate | | | | | | | | | | | | | | 2 | |
| | ethyl isobutylacetate | | | | | | | | | | | | | | | 2 |

TABLE 6(a)-continued

|  |  | CS 6.1[1] | 6.1 | 6.2 | 6.3 | 6.4 | 6.5 | 6.6 | 6.7 | 6.8 | 6.9 | 6.10 | 6.11 | 6.12 | CS 6.2[1] | CS 6.3[1] |
|---|---|---|---|---|---|---|---|---|---|---|---|---|---|---|---|---|
| Discoloration test | Discoloration of curable silicone composition after 28 days of storage at 50° C.: x: dark discoloration ◯: light discoloration ⊕: no discoloration | x (yellowed) | ⊕ | ⊕ | ⊕ | ⊕ | ⊕ | ⊕ | ⊕ | ⊕ | ⊕ | ⊕ | ⊕ | ⊕ | x | x |
| Tack free time | (minutes) | 28 | 28 | 28 | 38 | 19 | 19 | 42 | 31 | 13 | 12 | 60 | 60 | 17 | 30 | 17 |
| Transparency after curing | x: opaque ◯: good transparency | x | ◯ | ◯ | ◯ | ◯ | ◯ | ◯ | ◯ | ◯ | ◯ | ◯ | ◯ | ◯ | x | x |

[1]CE: Comparative Example

Example 7

In this example the catalyst and samples were made using an identical process to that described in example 6. Furthermore, the resulting samples were stored and tested in the same way. The molar ratios of tetraorganotitanate to chelate are provided in table 7(a)

As will be seen from Table 7(a) samples 7.1 to 7.9, featuring a chelate titanium catalyst in which [ethyl] trifluoroacetoacetate was used, were all colorless from the outset, and no discoloration or loss of transparency was seen over time. In contrast, CS 7.1 was observed to be discolored from the outset, and transparency was seen to deteriorate. An appropriate level of curability, was maintained in all cases.

Example 8

A further masterbatch sealant composition was prepared by mixing 63 parts of a polymer, an triethoxysilyl end-capped polydimethylsiloxane having a viscosity of 110000 centistokes, 20 parts of a polydimethylsiloxane fluid plasticiser having a viscosity of 100 centistokes, 2.6 parts of a methyltrimethoxysilane (MTM, curative 1) and 2.6 parts of isobutyltrimethoxysilane (iBTM, curative 2), 2.2 parts of a tetra (tertiary butoxy) titanate (compound(i)), 10.5 parts of a fumed undensified silica filler (LM 150), 1.2 parts by weight of a silicone glycol rheology additive, 1 part by weight of an amino-epoxysilane adhesion promoter at room temperature in absence of moisture. The above masterbatch was used as the basis of the following tests.

Channel adhesion tests were undertaken using the above masterbatch alone and in combination with 0.25% by weight of the complete composition of ethyl acetoacetate (EAA, comparative), 0.5% by weight of the complete composition TFA and 0.25% by weight of the complete composition of MPA respectively.

The cohesive failure test was the same as disclosed in Example 2.

TABLE 8.1

Improvement of Channel Adhesion by Chelating titanate

| Compound (ii) | % Cohesive failure after 4 days cure | % Cohesive failure after 7 days cure |
|---|---|---|
| EAA | 100 | 100 |
| TFA | 100 | 100 |
| MPA | 100 | 100 |
| Masterbatch | 30 | 50 |

It is to be noted that whilst EAA gave good channel adhesion results the expected yellow discoloration was observed. As expected neither TFA or MPA caused any discoloration.

The invention claimed is:

1. A moisture curable composition capable of cure to an elastomeric body, the composition comprising:
   A) a polymeric material having at least two groups, said groups in the polymeric material being the same and selected from the group consisting of
      a) hydroxyl groups, and
      b) hydrolysable groups;
   B) an alkoxysilane curing agent, and TABLE 7(a)

|  |  | CE 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Tetra-organo-titanate | tetraisopropoxytitanium | 1 | 1 | 1 | 1 |  |  |  |  |  |  |
|  | tetrabutoxytitanium |  |  |  |  | 1 | 1 | 1 |  |  |  |
|  | tetra-tert-butoxytitanium |  |  |  |  |  |  |  | 1 | 1 | 1 |
| Ketone compound | ethyl acetoacetate | 2 |  |  |  |  |  |  |  |  |  |
|  | ethyl trifluoromethylacetoacetate |  | 2 | 1 | 0.5 | 2 | 1 | 0.5 | 2 | 1 | 0.5 |
| Discoloration test of curable silicone composition | Discoloration after 14 days storage at 50° C.: x: dark discoloration ◯: light discoloration ⊕: no discoloration | x yellowed | ⊕ | ⊕ | ⊕ | ⊕ | ⊕ | ⊕ | ⊕ | ⊕ | ⊕ |
| Tack free time | (minutes) | 28 | 45 | 39 | 60 | 48 | 38 | 60 | 39 | 34 | 28 |
| Transparency after curing | x: opaque ◯: good | x | ◯ | ◯ | ◯ | ◯ | ◯ | ◯ | ◯ | ◯ | ◯ |

C) a catalyst comprising a material selected from the group consisting of:
   (I) a mixture of (i) and (iii), (II) a mixture of (ii) and (iii),
(III) a reaction product of (i) and (iii),
(IV) a reaction product of (ii) and (iii),
(V) a mixture of (I) and (III), and
(VI) a mixture of (II) and (IV), wherein
   (i) is M(OR)4,
   (ii) is M(OR')$_x$(Z),
wherein M is a metal having a valency of 4 selected from Group IVB of the Periodic Table, each R and R' is the same or different and is selected from the group consisting of
(i') primary aliphatic hydrocarbon groups,
(ii') secondary aliphatic hydrocarbon groups,
(iii') tertiary aliphatic hydrocarbon groups, and
(iv') —SiR$^9$, wherein each R$^9$ is an alkyl group having from 1 to 6 carbon atoms and Z is a group of the formula —O—Y—O— wherein Y is selected from the group consisting of:
(i") an alkylene group comprising from 1 to 8 carbon atoms and,
(ii") a branched alkylene radical comprising from 1 to 8 carbon atoms and x is 0 or 2, wherein when x is 0, z is 2 and when x is 2, z is 1; and,
   (iii) a compound having the general formula:

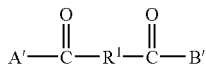

wherein R$^1$ is selected from the group consisting of:
a') a methylene radical and
b') substituted methylene radicals having from 1 to 6 carbon atoms, wherein A' is selected from the group consisting of:
(!) —(CX$_2$)$_n$C(R) wherein n is from 0 to 5,
(!!) an adamantyl group and
(!!!) an adamantyl derivative;
B' is selected from the group consisting of:
a") —(CX$_2$(R$^2$)$_3$, wherein t has a value of from 0 to 5,
b") a monovalent alkyl group having from 1 to 6 carbon atoms, and
c") OR$^3$, wherein R$^3$ is selected from the group consisting of:
a'") —(CX$_2$)$_t$C(R$^2$)$_3$ and
b'") a monovalent alkyl group having from 1 to 6 carbon atoms,
wherein each X is the same or different and is selected from the group consisting of:
a') a halogen radical and
") hydrogen, and each R$^2$ is the same or different and is selected from the group consisting of:
b') a halogen radical and
b") an alkyl radical having one to eight carbon atoms,
wherein when n is greater than 0, at least one of the X or R$^2$ is a halogen radical.

2. A composition as claimed in claim 1 wherein compound (iii) is selected from the group consisting of:
c$^i$) methyl pivaloyacetate and
c$^{ii}$) ethyl 4,4,4-trifluoroacetoacetate.

3. A composition as claimed in claim 1 wherein M in catalyst C) is titanium.

4. A composition as claimed in claim 1 wherein the catalyst C) is one or more of
di-tert-butoxytitanium bis(ethyl-3-oxo-4,4-dimethylhexanoate),
diisopropoxytitanium bis(methyl-3-oxo-4,4-dimethylhexanoate),
2,3-dimethyl-2,3-dioxybutanetitanium bis(methyl pivaloylacetate),
2-methyl-2,4-dioxypentanetitanium bis(methyl pivaloyacetate),
1,3 dioxypropanetitanium bis(methyl pivaloylacetate),
1,2 dioxyethanetitanium bis(methyl-3-oxo-4,4dimethylhexanoate),
2,3-dimethyl-2,3-dioxybutanetitanium bis(methyl-3-oxo-4,4-dimethylhexanoate),
2-methyl-2,4-dioxypentanetitanium bis(methyl-3-oxo-4,4-dimethylhexanoate),
diisopropoxytitanium bis(ethyltrifluoromethylacetoacetate),
di-tert-butoxytitanium bis(methylpentafluoroethylacetoacetate),
di-tert-butoxytitanium bis(methylpentafluoroethylacetoacetate),
diethoxytitanium bis(ethylpentafluoroethylacetoacetate),
2,3-dimethyl-2,3-dioxybutanetitanium bis(ethyltrifluoromethylacetoacetate),
2-methyl-2,4-dioxypentanetitanium bis(ethyltrifluoromethylacetoacetate),
1,3-dioxypropanetitanium bis(methylpentafluoroethylacetoacetate),
1,2-dioxyethanetitanium bis(ethylpentafluoroethylacetoacetate),
1,2-dioxyethanetitanium bis(methyltrfluoromethylacetoacetate),
1,3-dioxypropanetitanium bis(isopropyltrifluoromethylacetoacetate) and
2-methyl-2,4-dioxypentanetitanium bis(ethylpentafluoroethylacetoacetate).

5. A composition as claimed in claim 1 wherein M in catalyst C) is zirconium.

6. A composition as claimed in claim 1 wherein the catalyst C) is one or more of
di(2-ethylhexoxy)zirconium bis(methylpivaloyloacetate),
di(n-butoxy)zirconium bis(methylpivaloyloacetate),
di(n-propoxy)zirconium bis(methylpivaloyloacetate),
di(n-butoxy)zirconium bis(methyl-3-oxo-4,4-dimethylhexanoate),
di(n-propoxy)zirconium bis(methyl-3-oxo-4,4-dimethylnexanoate),
diisopropoxyzirconium bis(ethyltrifluoromethylacetoacetate),
di-n-butoxyzirconium bis(ethyltrifluoromethylacetoacetate),
di-n-propoxyzirconium bis(ethyltrifluoromethylacetoacetate),
di-tertiary-butoxyzirconium bis(ethylpentafluoroethyl acetoacetato),
diisopropoxyzirconium bis(ethylpentafluoroethylacetoacetate),
di-n-butoxyzirconium bis(ethylpentafluoroethylacetoacetate),
1,2-dioxyethanezirconium bis(methylpivaloyloacetate),
1,3-dioxypropanezirconium bis(methylpivaloyloacetate),
2,4-dimethyl-2,4-dioxypentanezirconium bis(ethylpivaloyloacetate),
2,3-diemthyl-2,3-dioxybutanezirconium bis(ethylpivaloyloacetate), 1,2-dioxyethanezirconium bis(ethyltrifluoromethylacetoacetate),
1,3dioxypropanezirconium bis(ethyltrifluoromethylacetoacetate),
2,3-dimethyl-2,3-dioxybutanezirconium bis(ethyltrifluoromethylacetoacetate),
2-methyl-2,4-dioxypentanezirconium bis(ethylpentafluoroethylacetoacetate),
tetra(ethyltrifluoromethylacetate zirconium,
di-tert-amyloxyzirconium bis(methylpivaloyloacetate),
di-tert-butoxyzirconium bis(ethyltrifluoromethylacetoacetate),
di-tert-amyloxyzirconium bis(ethyltrifluoromethylacetoacetate),
di-tert-amyloxyzirconium bis(ethylpentafluoroethylacetoacetate),
diisopropoxyzirconium bis(methylpivaloyacetate),
di(2-ethylhexoxy)zirconium bis(methylpivaloyloacetate) and
di-(n-butoxy)zirconium bis(methylpivaloyloacetate).

7. A composition as claimed in claim 1 wherein polymeric material A) has at least two groups bonded to silicon that are selected from the group consisting of:
   a) hydroxyl groups and
   b) hydrolysable groups.

8. A moisture curable composition as claimed in claim 7 wherein polymeric material A) is an essentially linear polydiorganosiloxane having terminal groups selected from the group consisting of:
   $d^i$) —Si(R")$_2$OH and
   $d^{ii}$) —Si(R")$_2$-(D)$_d$-R'"SiR"$_k$(OR$^5$)$_{3-k}$,
wherein D is —R'"—(Si(R"$_2$)—O)$_r$—Si(R")$_2$—, R" is selected from the group consisting of:
   $e^i$) alkyl group having from 1 to 6 carbon atoms,
   $e^{ii}$) a vinyl group,
   $e^{iii}$) a phenyl group and
   $e^{iv}$) a fluorinated alkyl group;
R'" is a divalent hydrocarbon group, r is a whole number between 1 and 6 and d is 0 or a whole number, R$^5$ is selected from the group consisting of:
   $f^i$) an alkyl group having up to 6 carbon atoms and
   $f^{ii}$) an oxyalkyl group having up to 6 carbon atoms, and
   k has a value of 0, 1, or 2.

9. A composition in accordance with claim 8 wherein d is 0 or 1, R'" is an ethylene group, k is 0 and R$^5$ is an ethyl group.

10. A composition as claimed in claim 1 wherein the alkoxysilane is selected from the group consisting of:
   $g^i$) methyltrimethoxysilane,
   $g^{ii}$) vinyltrimethoxysilane,
   $g^{iii}$) methyltrimethoxysilane,
   $g^{iv}$) isobutyltrimethoxysilane, and
   $g^v$) vinyltrimethoxysilane.

11. A composition according to claim 1 wherein said composition further comprises a finely divided filler which is predominantly silica.

12. An elastomeric product comprising the moisture cured composition in accordance with claim 1.

13. A catalyst composition for catalyzing a reaction between a polymeric material and an alkoxysilane curing agent, wherein the polymeric material has at least two groups selected from the group consisting of:
   a) hydroxyl groups, and
   b) hydrolyzable groups, the catalyst comprising a material selected from the group consisting of:
   (I) a mixture of (i) and (iii),
   (II) a mixture of (ii) and (iii),
   (III) a reaction product of (i) and (iii),
   (IV) a reaction product of (ii) and (iii),
   (V) a mixture of (I) and (III), and
   (VI) a mixture of (II) and (IV), wherein
   (i) is M(OR)4,
   (ii) is M(OR')$_x$(Z),
      wherein M is a metal having a valency of 4 selected from Group IVB of the Periodic Table, each R and R' is the same or different and is selected from the group consisting of
      (i') primary aliphatic hydrocarbon groups,
      (ii') secondary aliphatic hydrocarbon groups,
      (iii') tertiary aliphatic hydrocarbon groups, and
      (iv') —SiR$^9_3$, wherein each R$^9$ is an alkyl group having from 1 to 6 carbon atoms and Z is a group of the formula —O—Y—O— wherein Y is selected from the group consisting of:
      (i") an alkylene group comprising from 1 to 8 carbon atoms and,
      (ii") a branched alkylene radical comprising from 1 to 8 carbon atoms and x is 0 or 2, wherein when x is 0, z is 2 and when x is 2, z is 1,
   and, (iii) is a compound having the general formula:

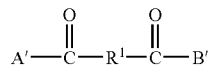

wherein R$^1$ is selected from the group consisting of:
   a') a methylene radical and
   b') substituted methylene radicals having from 1 to 6 carbon atoms, wherein A' is selected from the group consisting of:
   (!) —(CX$_2$)$_n$C(R$^2$)$_3$ wherein n is from 0 to 5,
   (!!) an adamantyl group and
   (!!!) an adamantyl derivative;
   B' is selected from the group consisting of:
   a") —(CX$_2$)$_t$C(R$^2$)$_3$, wherein t has a value of from 0 to 5,
   b") a monovalent alkyl group having from 1 to 6 carbon atoms, and
   c") OR$^3$, wherein R$^3$ is selected from the group consisting of:
   a'") —(CX$_2$)C(R$_2$)$_3$ and
   b'") a monovalent alkyl group having from 1 to 6 carbon atoms, wherein each X is the same or different and is selected from the group consisting of:
   a') a halogen radical and
   a") hydrogen,
   wherein each R$^2$ is the same or different and is selected from the group consisting of:
   b$^1$) a halogen radical and
   b") an alkyl radical having one to eight carbon atoms, wherein when n is greater than 0, at least one of the X or R$^2$ is a halogen radical combined with a material selected from the group consisting of:
   h') an alkoxy silane, and
   h") a tertiary amyl alcohol.

14. A catalyst in accordance with claim 13 wherein the alkoxysilane is methyltrimethoxysilane.

* * * * *